April 18, 1961    B. SALMON ET AL    2,979,899
FLAME SPREADING DEVICE FOR COMBUSTION EQUIPMENTS
Filed May 3, 1954    4 Sheets-Sheet 1
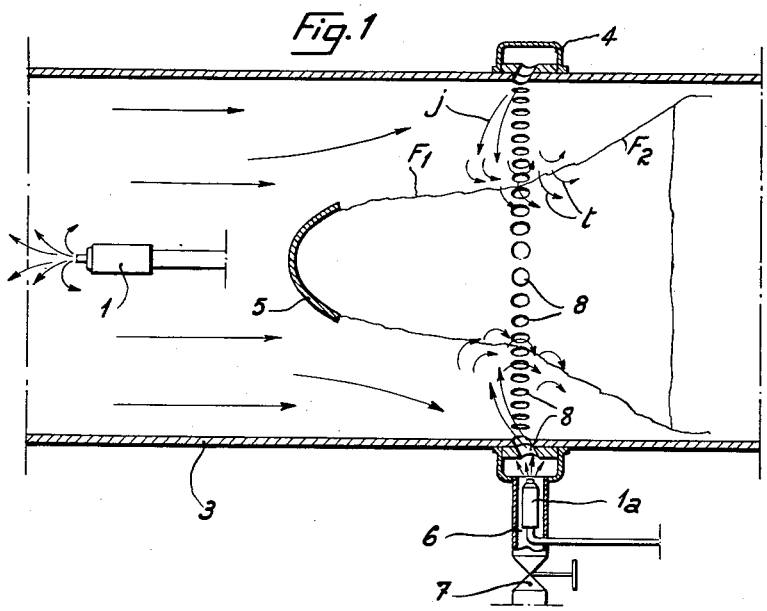
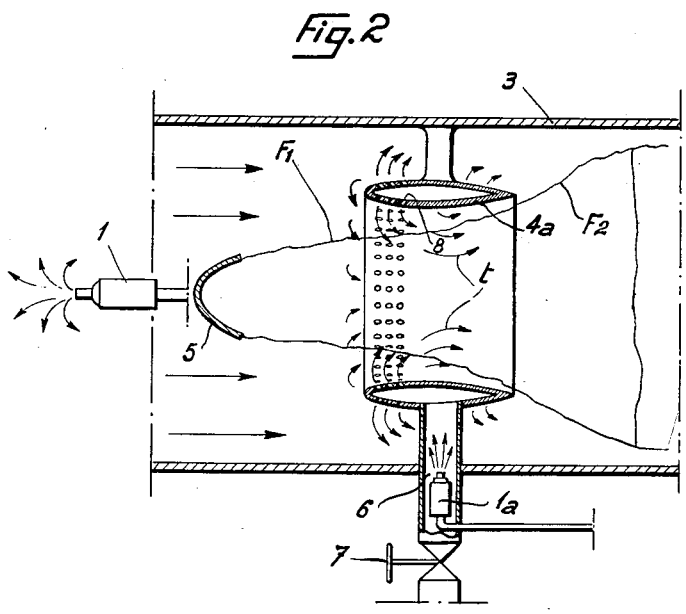
INVENTORS
Benjamin Salmon
Jean H. Bertin
By Watson, Cole, Grindle & Watson
ATTORNEYS

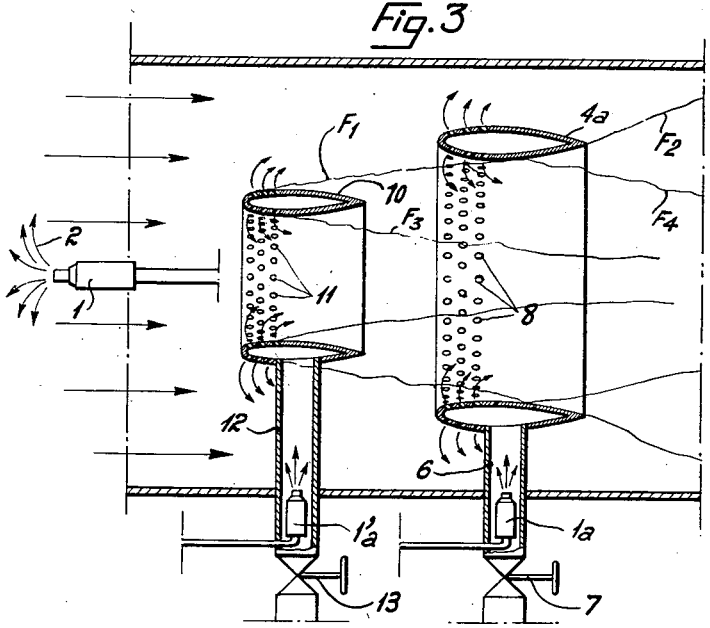
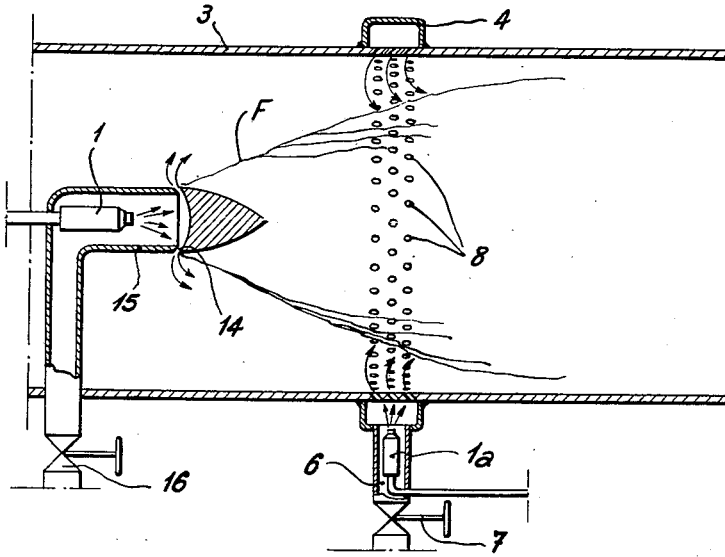

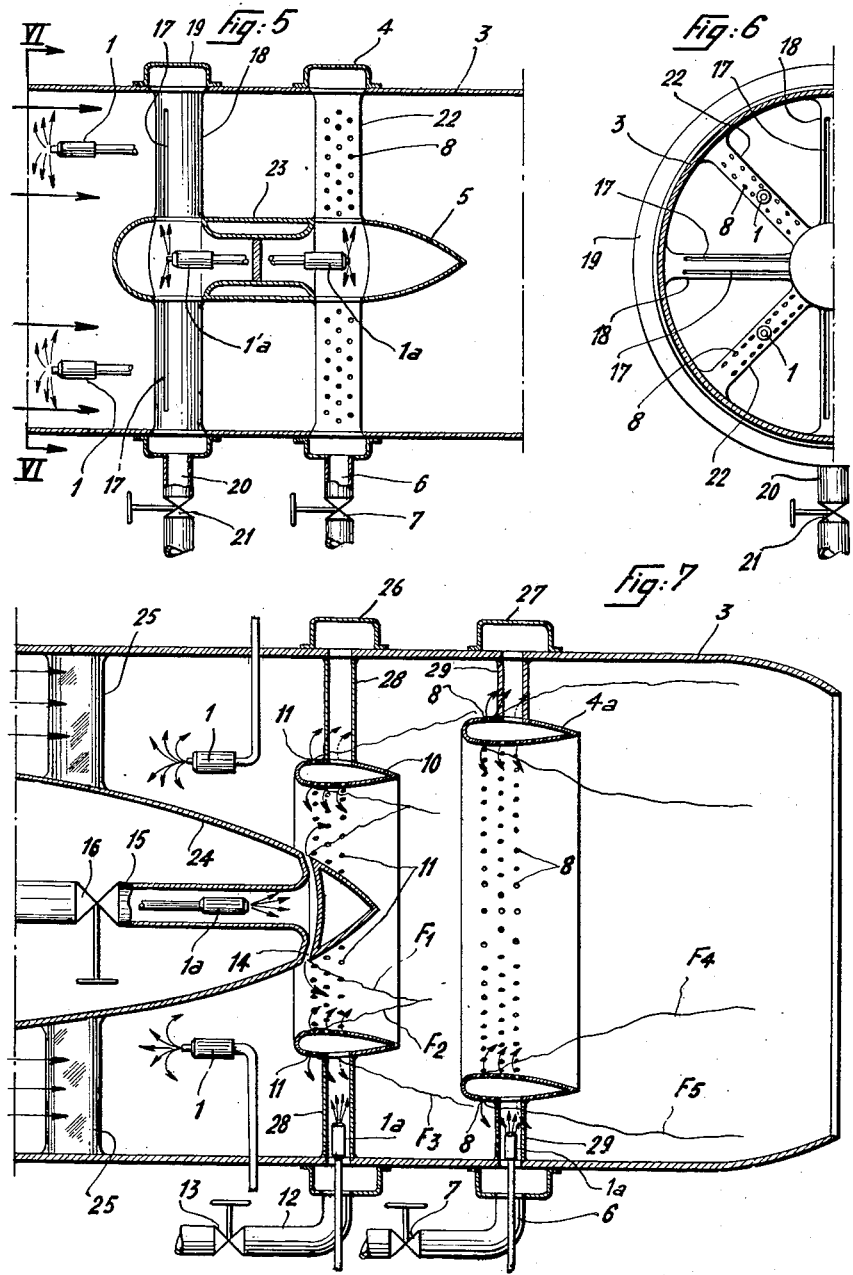

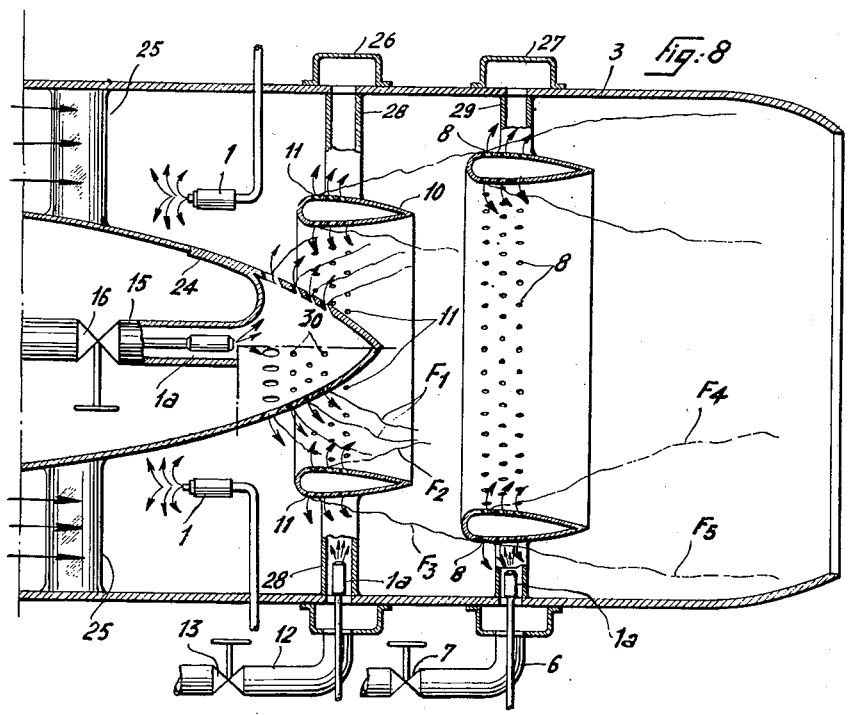
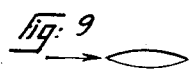
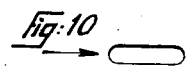
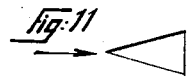
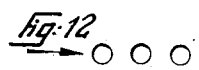
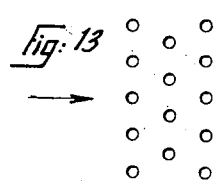

United States Patent Office 2,979,899
Patented Apr. 18, 1961

2,979,899

FLAME SPREADING DEVICE FOR COMBUSTION EQUIPMENTS

Benjamin Salmon, Suresnes, and Jean H. Bertin, Neuilly-sur-Seine, France, assignors to Societe Nationale d'Etude et de Construction de Moteurs d'Aviation, Paris, France, a French company Filed May 3, 1954, Ser. No. 427,114

Claims priority, application France June 27, 1953

5 Claims. (Cl. 60—39.72)

The problem of combustion in a current of fluid flowing at high speed arises particularly in the case of combustion chambers of gas turbines and more especially in the case of combustion chambers of propulsion units for aircraft power plants (turbo-prop units, turbo-jet units, ram-jet units, re-heating devices between turbine stages or following the turbines, rockets, etc.).

The speed of propagation of a flame in a carburetted mixture in the state of rest is very low and is of the order of a few meters per second.

The stabilization of a flame inside a conduit through which passes, for example, a current of carburetted air, and which is not provided with any special arrangements, can only be effectively carried out if the speed of flow does not exceed the speed of propagation of the flame. In order to effect this stabilization, there are generally provided in the gaseous flow, masks or screening devices which produce dead zones on the downstream side, in which the speed of the flow is small and in which the fuel introduced by injectors into the flow of gas containing oxygen, or the previously-formed mixture containing oxygen and fuel, is given the time necessary for its ignition.

However, it is not only necessary to stabilize the flame, but also to increase its speed of propagation in the transverse direction, or in other words to increase the liveliness of the combustion, since there is, in general, only available a short length of passage of the gases in which all the fuel must be burned, and in the particular case of apparatus for aircraft, it is very desirable to reduce the overall size to the minimum and, in consequence, to produce a complete combustion within volumes which are as small as possible.

The present invention has for its object to provide a device for promoting the spreading or transverse propagation of a stabilized flame produced by the combustion of fuel within a high-velocity gaseous stream flowing through a combustion chamber and stabilized by a flame stabilizer upstream of said device.

The description which follows below with respect to the attached drawings (which are given by way of example only and not in any sense by way of limitation) will make it quite clear how the invention may be carried into effect.

Figs. 1 to 5, 7 and 8 are views in axial section of combustion chambers equipped with different forms of embodiment of the invention.

Fig. 6 is a cross-section following the line VI—VI of Fig. 5.

Figs. 9 to 13 show by way of example, various shapes and arrangements of gas injecting orifices.

In Fig. 1 there has been shown a chamber 3 such as a combustion chamber, through which the combustion-supporting gas passes from left to right.

An injector device such as 1 is arranged on the upstream side of a flame-stabilizer 5 and injects fuel preferably in a direction opposite to that of the gas-flow, as shown in the figure.

By way of example only and without limitation of the invention, there has been shown a flame stabilizer of the usual type comprising a solid screen 5 which creates downstream a wake zone of reduced speed in which the flame can maintain itself.

It will be clear that the flame stabilizer may be constituted by a fluid screen such as described hereafter.

In a suitably located plane, the wall of the chamber 3 is pierced to form one or a number of rows of orifices 8, the axes of which may or may not be inclined at an angle with respect to the direction of flow.

By means of a collector chamber 4 and a pipe 6 provided with a valve 7, the orifices may be connected to a source of compressed air or other gas, the total pressure of which is greater than the static pressure obtaining in the gas stream in the zone of these orifices.

The shape of the orifices 8 is preferably adapted to produce elementary jets which penetrate to a considerable extent into the main stream. These jets $j$ give rise at their origin but to very small wakes in the main stream and there is thus no risk of stabilizing a ring of flame in the peripheral zone of the chamber 3 where it would not be desirable, as it would be liable to cause deterioration of the wall of the chamber.

The position of the jets with respect to the stabilizing screen 5 is such that the zone of microturbulence which they produce by diffusion in the main stream is located downstream of the stabilizer.

Starting from the stabilizer 5, a front of flame F1 is initiated with a relatively low transverse speed. Starting from the zone of turbulence created by the jets $j$ and shown diagrammatically by the vortices $t$, the activity of combustion is accelerated and this is accompanied by an increase in the transverse speed of propagation and an increased inclination of the resulting front of flame F2.

Fig. 1 also shows a fuel injector $1a$ disposed inside the pipe 6 which supplies air to the collector chamber 4. This injector $1a$ receives a portion of the fuel which is to be burned inside the chamber 3 (the greater part of the fuel being introduced through the injector 1) and sprays it into the air which supplies the chamber 4.

In this way, advantage may be taken of the division of the air-jets produced by the orifices 8, and of the turbulence created by these jets within the chamber 3, to obtain a fine spraying effect of the fuel introduced in this way into the said chamber, even if the spraying effect of the injector $1a$ in the collector 4 is only coarse.

An arrangement of this kind will be shown in all the figures which are described hereinafter.

In the alternative form shown in Fig. 2, the flame spreading device is constituted by a hollow ring $4a$, which has a faired longitudinal section, and which is arranged with the main stream and is provided on both faces with several series of small circular orifices 8 which give rise to small high-velocity gaseous jets passing out transversely into the main stream.

The position and the dimensions of the ring $4a$ will be determined in accordance with the position and the dimensions of the stabilizing screen 5. The dimensions, the shape and the inclination of the orifices 8 situated on the external face of the ring $4a$ may be determined in dependence on the momentum of the small jets which are discharged from them, in such a way that the front of flame F2, enlarged by the turbulence resulting from the said small jets, does not extend to the walls of the chamber 3.

In the alternative form shown in Fig. 3, the flame-stabilizing device comprises a hollow ring 10, similar to the hollow ring $4a$ of Fig. 2, but of smaller diameter and arranged downstream of the injector 1. This ring is provided, both on its internal and on its external faces, with a series of orifices 11 through which is ejected air under pressure led in through the conduit 12 and the valve 13, this air being carburetted in the same way as has already been stated above, by means of an injector 1'a through which a part of the fuel is passed. The orifices 11 being oriented in order that the air jets shall have a component of speed at right angles to the direction of flow of the main stream in the chamber 3, these jets create behind them wake zones in which the flame is stabilized. There are thus formed two fronts of flame F1, F3, which are approximately conical in shape.

The flame spreading device is constituted by a ring 4a of larger diameter, and identical to the ring 4a described with reference to Fig. 2 and having the same function. It should, however, be noted that due to the annular shape of the ring 10 which acts as a flame-stabilizer and due to the formation of an internal front of flame F3, not only do the external orifices 8 of the ring 4a act so as to enlarge the front of flame F1, but also the internal orifices 8 of the said ring set-up in the wakes which they create, a fresh combustion having a flame-front F4.

In the alternative form of embodiment shown in Fig. 4, the flame spreading device comprises one or a number of rows of small orifices 8 pierced in the wall of the chamber 3 and supplied from a ring 4, as in the case of Fig. 1.

The stabilization of the flame is obtained by means of a gaseous screen formed close to a continuous slot 14 located on the downstream side of the fuel injector 1. The latter is located inside the pipe 15 which brings in the air under pressure to supply the slot 14, and which is provided with a valve 16, this air serving at the same time as primary air for the combustion which thus takes place in the wake of the annular gaseous jet issuing from the slot 14. This latter slot could be replaced by one or a number of series of small orifices.

A further fuel-injector 1a is housed inside the pipe 6 which supplies air to the ring 4.

In the form of embodiment shown in Figs. 5 and 6, the gaseous screen serving to stabilize the flame is formed by the escape of air under pressure through radial slots 17 formed in hollow arms 18 of streamlined section and extending radially or inclined at an angle inside the chamber 3. These arms are themselves supplied with air by a peripheral collector 19 connected by the pipe 20 and the valve 21 to the source of compressed air. The arms 18 are four in number in the example shown and are associated with four injectors 1 arranged on the upstream side of the spaces between these arms.

The flame spreading device consists of small orifices 8 formed in radial arms 22 arranged on the downstream side of the arms 18 and facing the spaces between these latter, that is to say in the wake of the injectors 1. The orifices 8 are supplied with air from the collector 4 connected to the pipe 6 which is fitted with a valve 7. Auxiliary fuel-injectors 1'a and 1a discharge into the air supplied to the hollow arms 18, 22.

In an alternative form, the slots 17 of the arms 18 could be replaced by series of small orifices similar to the orifices 8 of the arms 22 and the supply of air to these arms, instead of being made through peripheral collectors 4, 19, could be effected by means of the streamlined central body 23 which carries the arms in the axis of the chamber 3.

The length of the blowing slots 17 as well as the portion of the arms 22 in which the orifices 8 are formed, may stop short at a certain distance from the wall of the chamber 3, so as to obtain a non-turbulent ring of the main fluid which thereby protects the wall of the chamber against excessive heating.

Fig. 7 shows an exhaust reheat system for a jet propulsion unit equipped with a device in accordance with the invention. In the upstream portion of the reheat combustion chamber is located a central body 24, the diminishing cross-section of which from the upstream to the downstream side enables the speed of the combustion-supporting gas delivered from the turbine, to be reduced.

This central body is supported by airfoil section arms 25 which connect it to the outer wall of the exhaust duct. It may be constituted by the cowling member which is often provided in turbo-jet units at the delivery side of the turbine, and which contains the rear bearing of this latter. The downstream portion of this body 24 is so arranged as to produce, together with the hollow ring 10 of faired longitudinal section, the gaseous screens which serve to stabilize the flame of the reheat fuel injectors 1 disposed around the central body 24. This body is provided to this end with an annular slot 14 through which is discharged the air under pressure led in through the pipe 15 and the valve 16. The ring 10 is itself provided, both on its internal face and on its external face, with a number of series of small orifices 11 which are supplied with air through the pipe 12 and the valve 13. By virtue of the action of the jets of air expelled transversely into the flow of combustion-supporting gas, the flame is thus stabilized at a number of fronts F1, F2, F3. The flame spreading device is constituted by a hollow ring 4a which has a larger diameter than the ring 10 and operates in a similar manner to the ring 4a of Fig. 3. This ring 4a is provided for that purpose with small orifices 8 pierced both on its internal face and on its external face, and it is supplied with air through the pipe 6 and the valve 7. There has been shown in the drawing, both in respect of the ring 10 and the ring 4a, a detail of the supply system consisting of the annular collectors 26, 27, which are respectively connected to the pipes 12 and 6 and communicate with the rings 10 and 4a through the medium of streamlined radial arms 28, 29. The incoming air supply pipe 15 and also the radial arms 28, 29, or some of these latter, may be provided with auxiliary fuel-injectors 1a.

The ring 4a has the effect of enlarging, as shown at F5, the peripheral flame-front F3 whilst at the same time it improves the combustion in the center by creating at that point a new flame-front F4.

By suitably varying the quantity of fuel delivered to the injectors 1 and 1a, as well as the quantity of air by means of the valves 16, 7 and 13, the combustion may be controlled to the best effect so as to obtain an optimum distribution of the flame.

The orifices 11 and 8 formed in the external faces of the rings 10 and 4a will have a cross-section such that the penetration into the gaseous flow of the jets which they supply will not be too great, in such a manner that the flame-fronts F3 and F5 are located at a certain distance from the internal wall of the discharging conduit 3, thereby permitting the maintenance along this wall of a ring of non-burning fluid which protects the wall against excessive heating.

Account will be taken of this fact in the determination of the position of the injector 1 or the distribution of fuel which they effect, in order that this protective ring of fluid is not uselessly carburetted.

This observation is also valid for the forms of embodiment shown in Figs. 2 and 3 and also in respect of that which will be described below with reference to Fig. 8.

The arrangement of Fig. 7 permits of a very rapid propagation of the flame along sharply inclined fronts such as F1, F2, F3, F4, F5. It enables, in addition, a uniform and progressive distribution of temperature to be obtained as well as an effective protection of the walls against heat.

The alternative form shown in Fig. 8 only differs from the preceding embodiment shown in Fig. 7 in the substitution of orifices 30 for the annular slot 14 on the central body 24 so as to create, not an annular stabilizing continuous screen but a series of jets. These orifices 30 may be arranged in several successive rows. Their diameter will preferably decrease from the upstream row to the row farthest downstream.

In all the preceding forms of embodiment, the orifices formed on the flame spreading device may have various shapes, depending on the type of case considered and the conditions to be observed.

Figs. 9 to 11, for example show orifices the larger dimension of which is parallel to the direction of the main flow. These orifices give jets which have at their base a very small wake which is insufficient for the initiation of a nucleus of combustion. On the other hand, jets of this kind are able to penetrate deeply into the main gaseous flow and thus enable a considerable turbulence to be induced in distant parts of the flow.

In cases such as those of Figs. 1 and 4, for example, orifices of this kind arranged at the periphery of a combustion chamber of large radius, enable the liveliness of combustion of a flame burning in the center of the chamber to be acted upon.

An elongated orifice may, of course, be replaced by a series of round or square orifices placed, one at the side of the other, Fig. 12 thus shows three round orifices placed one in line with the other in the direction of the flow of current, and the association of which possesses properties similar to those of an orifice of the type shown in Figs. 9 to 11.

Finally, Fig. 13 shows a method of use of very small orifices the size of which may be, for example, of the order of a millimeter and which are grouped very close together in one or a number of rows. The small jets issuing from such orifices supply, by virtue of their grouping, a global wake zone which is sufficiently large for the maintenance of a nucleus of flame at the base of the jet; these jets have, however, by reason of the small dimensions of the orifices, a very small penetration. The zone of micro-turbulence due to the diffusion of the jets in the main flow is located in the immediate proximity of the center of combustion and on its downstream side, so that jets of this kind enable a high speed to be obtained in the development of the flame. There is, on the other hand, a constant supply of the small wakes of the jet with the combustion-supporting gas, which finds a passage between the jets. A grouped arrangement of such small jets thus enables either the flame to be stabilized or the combustion to be rapidly propagated or both these effects to be achieved simultaneously.

In all the foregoing forms of embodiment, it is in general preferable to direct the axis of the orifices in such a manner that the jets issuing from them are inclined towards the upstream side of the main flow.

The invention is, of course, applicable to all fire-chambers and combustion chambers. Although cylindrically-shaped chambers have been mainly shown in the drawings, the invention is clearly applicable to chambers of annular shape such as are met within certain types of gas turbines or aircraft engines. It is also applicable to the combustion devices in which the fuel is vaporized before being introduced into the combustion chamber or the fire-chamber, or during the course of its introduction. It is also applicable to both gaseous or powdered fuels. Finally, it covers all the possible combinations of the devices which have been described.

It enables either new types of combustion chambers to be constructed or it may be applied to the improvement of combustion chambers or fire-chambers already existing.

The jets may be supplied by any suitable source of gas under pressure, for example from an auxiliary compressor or, in the case of a turbo-jet unit, by taking a part of the delivery from the air compressor incorporated in the said unit.

What we claim is:

1. In the combustion equipment of a jet popuplsion unit, a combustion chamber traversed by a flow of gas, means for injecting fuel into said flow, a flame-holder for stabilizing a flame produced by the combustion of said fuel in said flow, said flame originating at said flame-holder and extending downstream thereof in said flow, and a flame spreading device comprising a multiplicity of elemental nozzles at a distance downstream of said flame-holder, circumferentially spaced from each other and opening within said stabilized flame in a direction pointing towards the exterior of said flame and making a substantial upstream angle with the direction of said flow, each said nozzle having a dimension transverse to said flow which is not larger than its dimension parallel to the flow to produce, when supplied with pressure fluid, transverse jets issuing therefrom with such a cross-sectional outline as to minimize wake formation in and resistance to said flow, said jets originating in the inside of said stabilized flame and projecting outside the same, whereby said stabilized flame is urged transversely of the direction of said flow and therefore spreads out in said combustion chamber.

2. The combination of claim 1, wherein the elemental nozzles are distributed along successive rows spaced along the flow direction through the combustion chamber.

3. The combination of claim 2, wherein the jet propulsion unit comprises a central body tapering downstream and forming an inner conical wall of an annular part of the combustion chamber, wherein the flame-holder comprises nozzles distributed in a transverse row on said central body and opening into said annular passage through said wall, and wherein the flame spreading device comprises elemental nozzles distributed along successive transverse rows downstream of the row of flame-holder nozzles.

4. The combination of claim 1, wherein the elemental nozzles have an elongated shape in a direction parallel to the flow direction through the combustion chamber.

5. The combination of claim 1, wherein the flame-holder comprises nozzles opening into the combustion chamber at a substantial angle with the flow direction therethrough, and means for supplying a mixture of compressed air and unburnt fuel to said flame-holder nozzles, said latter means being separate and distinct from the elemental nozzle supply means.

References Cited in the file of this patent

UNITED STATES PATENTS

| 2,219,696 | Mueller et al. | Oct. 29, 1940 |
| 2,457,157 | King | Dec. 28, 1948 |
| 2,475,911 | Nathan | July 12, 1949 |
| 2,526,122 | Darlington | Oct. 17, 1950 |
| 2,552,492 | Nathan | May 8, 1951 |
| 2,672,727 | Brown | Mar. 23, 1954 |
| 2,771,743 | Lovesey | Nov. 27, 1956 |

FOREIGN PATENTS

| 156,005 | Australia | Oct. 16, 1952 |
| 1,000,961 | France | Oct. 17, 1951 |